(12) United States Patent
Pircon et al.

(10) Patent No.: US 8,800,756 B2
(45) Date of Patent: Aug. 12, 2014

(54) EXTERNALLY ADJUSTABLE INTERNAL WEARLINER FOR A MATERIAL CONVEYOR SYSTEM

(71) Applicant: Benetech, Inc., Aurora, IL (US)

(72) Inventors: John S. Pircon, Oak Brook, IL (US); Kevin T. Jasin, Aurora, IL (US); Dennis E. Taylor, Buda, IL (US)

(73) Assignee: Benetech, Inc., Aurora, IL (US)

( * ) Notice: Subject to any disclaimer, the term of this patent is extended or adjusted under 35 U.S.C. 154(b) by 0 days.

(21) Appl. No.: 13/889,551

(22) Filed: May 8, 2013

(65) Prior Publication Data

US 2014/0054140 A1 Feb. 27, 2014

Related U.S. Application Data

(60) Provisional application No. 61/692,038, filed on Aug. 22, 2012.

(51) Int. Cl.
*B65G 15/00* (2006.01)
*B65G 21/20* (2006.01)

(52) U.S. Cl.
CPC ........ *B65G 21/2072* (2013.01); *B65G 21/2081* (2013.01)
USPC .................................................... 198/836.1

(58) Field of Classification Search
CPC ........... B65G 21/2063; B65G 21/2045; B65G 21/2072; B65G 21/2081; B65G 2201/04; B65G 13/12; B65G 11/166
USPC ............................................ 198/836.1, 836.3
See application file for complete search history.

(56) References Cited

U.S. PATENT DOCUMENTS

| 3,344,909 | A | * | 10/1967 | Hansen et al. | ............. 198/836.1 |
| 4,877,125 | A | | 10/1989 | Gordon | |
| 5,154,280 | A | | 10/1992 | Mott | |
| 5,291,988 | A | * | 3/1994 | Leonard | ...................... 198/836.3 |
| 6,575,294 | B1 | | 6/2003 | Swinderman et al. | |
| 6,763,935 | B2 | * | 7/2004 | Ostman | ........................ 198/836.1 |
| 7,258,228 | B1 | * | 8/2007 | Herren | ........................ 198/836.3 |
| 7,484,617 | B1 | * | 2/2009 | Flood et al. | ................. 198/836.1 |
| 7,571,802 | B2 | | 8/2009 | Bowman | |
| 8,006,830 | B2 | | 8/2011 | Swinderman | |
| 2004/0031666 | A1 | | 2/2004 | Ostman | |
| 2010/0072035 | A1 | * | 3/2010 | Brody et al. | ................. 198/836.1 |

FOREIGN PATENT DOCUMENTS

| JP | 60-132813 A | 7/1985 |
| WO | 2004009477 A1 | 1/2004 |

OTHER PUBLICATIONS

International Search Report for PCT/US2013/040139 mailed Aug. 19, 2013.
Written Opinion of International Searching Authority for PCT/US2013/040139 mailed Aug. 19, 2013.

* cited by examiner

*Primary Examiner* — James R Bidwell
(74) *Attorney, Agent, or Firm* — Ungaretti & Harris LLP

(57) ABSTRACT

A wearliner assembly having an internally mounted wearliner for a bulk material conveying system. The wearliner assembly includes an external camming mechanism to adjust the height of the wearliner.

20 Claims, 6 Drawing Sheets

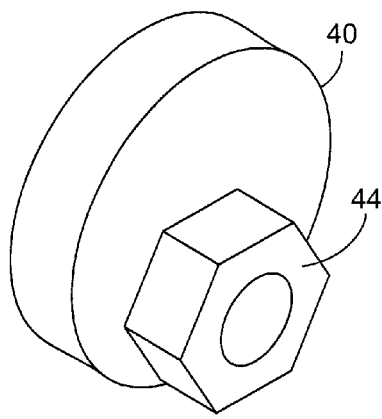
FIG. 7
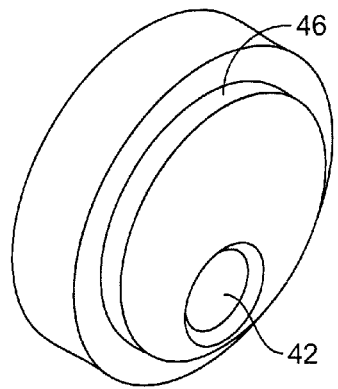
FIG. 8
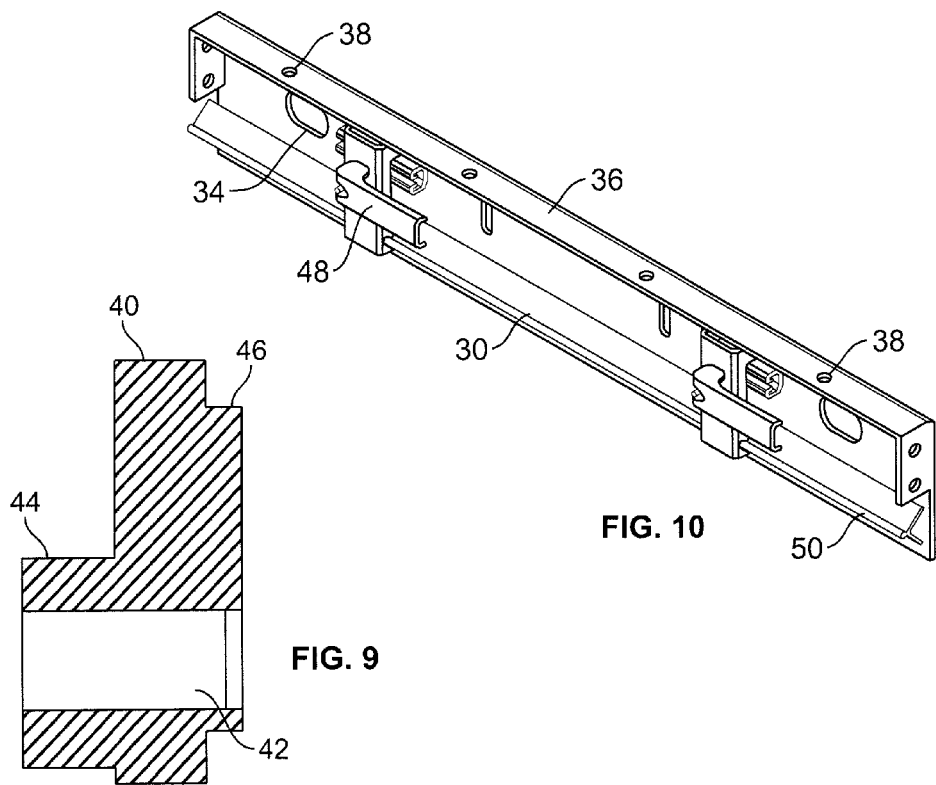
FIG. 9
FIG. 10

EXTERNALLY ADJUSTABLE INTERNAL WEARLINER FOR A MATERIAL CONVEYOR SYSTEM

CROSS-REFERENCE TO RELATED APPLICATIONS

The present application claims the benefit of U.S. Provisional Application No. 61/692,038, filed Aug. 22, 2012, the contents of which are incorporated herein by reference.

FEDERALLY SPONSORED RESEARCH OR DEVELOPMENT

N/A

FIELD OF THE INVENTION

The present invention generally relates to an internal wearliner mounted for external adjustment to the skirt of a material conveyor system, and more particularly to an internal wearliner mounted to the skirt to allow for external adjustment via a camming mechanism.

BACKGROUND OF THE INVENTION

Bulk material conveying systems are used to transfer material (such as coal) from a first location to a second location. Wearliners can be used to extend the life of the system. One type of wearliner was positioned on the non-load side (i.e., outside) of the chute to enable adjustment of the liner (as shown in FIG. 14). However, such placement exposes the chute walls to the material load and creates a danger of material getting lodged between the chute wall and the wearliner.

The present system provides an improved wearliner assembly designed to overcome certain deficiencies found in prior systems.

SUMMARY OF THE INVENTION

The present invention provides an externally adjustable, internal wearliner assembly, and a method for externally raising and lowering the wearliner of the assembly. The wearliner assembly provides protection inside the chute while having an adjusting mechanism that is accessible from the outside (i.e., external to the load bearing surface or side of the chute). In this assembly, the wearliner is conventionally positioned to protect the chute wall. The external adjustment means there is no need to enter the chute to adjust the wearliner.

In accordance with one embodiment of the invention, an externally adjustable internal wearliner assembly for a material conveying system is provided. The wearliner assembly comprises a first wearliner (typically in the form of a rectangular plate of material, such as stainless steel) having a load side and a mounting side. The load side of the wearliner faces the interior of the material conveying system and comes into contact with the material being transferred on the belt of the system. The mounting side of the wearliner faces the exterior side of the system and includes a first mounting member extending outward from the mounting side (such as a post or stud). The wearliner assembly further comprises a first externally mountable camming mechanism connectable to the first mounting member. The first wearliner is configured to be positioned on an interior side of a first skirt portion of a conveying system and the camming mechanism is configured to be positioned on an external side of the first skirt portion. Movement of the camming mechanism raises or lowers the first wearliner when mounted to the first skirt portion. This allows for adjusting the position of the wearliner as desired.

The wearliner assembly can further include an extension skirt panel connectable to the first skirt portion of the conveying system. The extension skirt panel includes a first side positioned against the mounting side of the first wearliner and a second opposing side. The extension skirt panel includes a first opening aligned with the first mounting member wherein the first mounting member passes through the first aperture. The assembly can further include a seal (which can be made from rubber or some other suitable material) and a clamp connected to the second side of the extension skirt panel for holding the seal to the wearliner assembly. The clamp can include a quick release mechanism. The extension skirt panel can include an L-shaped bracket portion for connecting the extension skirt panel to the first skirt portion.

Generally, the first wearliner is formed as a flat rectangular plate. In accordance with an alternative embodiment, the wearliner includes a first rectangular plate portion in a vertical plane having a top portion and a bottom portion, and a second plate portion extending at an angle from the bottom portion of the first rectangular plate portion toward the interior of the conveying system.

The mounting member can be a stud or post welded to the mounting side of the first wearliner. More than one mounting member can be connected to the wearliner.

The camming mechanism is secured to the stud and abuts an edge of the aperture. The camming mechanism can include a cylindrical cam that is pivotable about a point that is off-center. In this instance, rotational movement of the cam (about the off-center pivot point) raises or lowers the first wearliner with respect to the first skirt portion. The cam can be secured to the stud by a turnable nut. The internally positioned wearliner can be adjusted by loosening the nut, rotating the cam and retightening the nut. Each mounting member can be provided with a camming mechanism.

In an alternative embodiment, the camming mechanism can be provided with an outer shape having flat surfaces, such as a hexagonal shape. The flat surfaces can be engaged by a tool to facilitate movement of the cam to adjust the camming surface and the position of the wearliner.

The wearliner can be a stainless steel plate. Alternatively, the wearliner can be a ceramic, or some other suitable material.

In another embodiment of the invention, a bulk material conveying system having an externally adjustable internal wearliner is provided. The material conveying system includes a moveable belt for transporting material. A first substantially vertical chute wall is positioned proximate a first side of the belt. The first chute wall includes a load facing side (i.e., facing the material transported on the belt) and an exterior side. A lower portion of the chute wall is positioned above an upper surface of the belt. A first wearliner assembly is connected to the lower portion of the first chute wall. The first wearliner assembly includes a skirt extension connected to the lower portion of the first chute wall. The skirt extension includes a vertical wall portion having a load facing side and an exterior side extends down from and is aligned with the lower portion of the first chute wall. The skirt extension further includes a plurality of mounting openings. A wearliner is positioned against the load facing side of the vertical wall portion (i.e. on the interior side). A plurality of first mounting members extend outward from the wearliner through the openings in the vertical wall portion, and a plurality of first adjustable cams connected to the first mounting members on the exterior side of the vertical wall portion. A second similar assembly can be connected to a lower portion of a second chute wall.

The skirt extension includes a clamp connected to the exterior side. A seal is held in place by the clamp.

The cam includes a generally cylindrical camming surface and has a non-central point of rotation.

The wearliner can be a generally rectangular plate. Alternatively, the wearliner can include a first vertical portion and a second portion extending inwardly from a lower portion of the first vertical portion at an angle.

Further aspects of the invention are disclosed in the Figures, and are described herein.

BRIEF DESCRIPTION OF THE DRAWINGS

To understand the present invention, it will now be described by way of example, with reference to the accompanying drawings and attachments in which:

FIG. 7 is a perspective view of an exterior side of a cam of a camming mechanism of the wearliner assembly of the present invention;

FIG. 8 is a perspective view of an interior side of the cam of FIG. 7;

FIG. 9 is a cross-sectional view of the cam of FIG. 7;

FIG. 10 is a perspective view of a skirt clamp of the wearliner assembly of the present invention;

DETAILED DESCRIPTION

Figure 1:
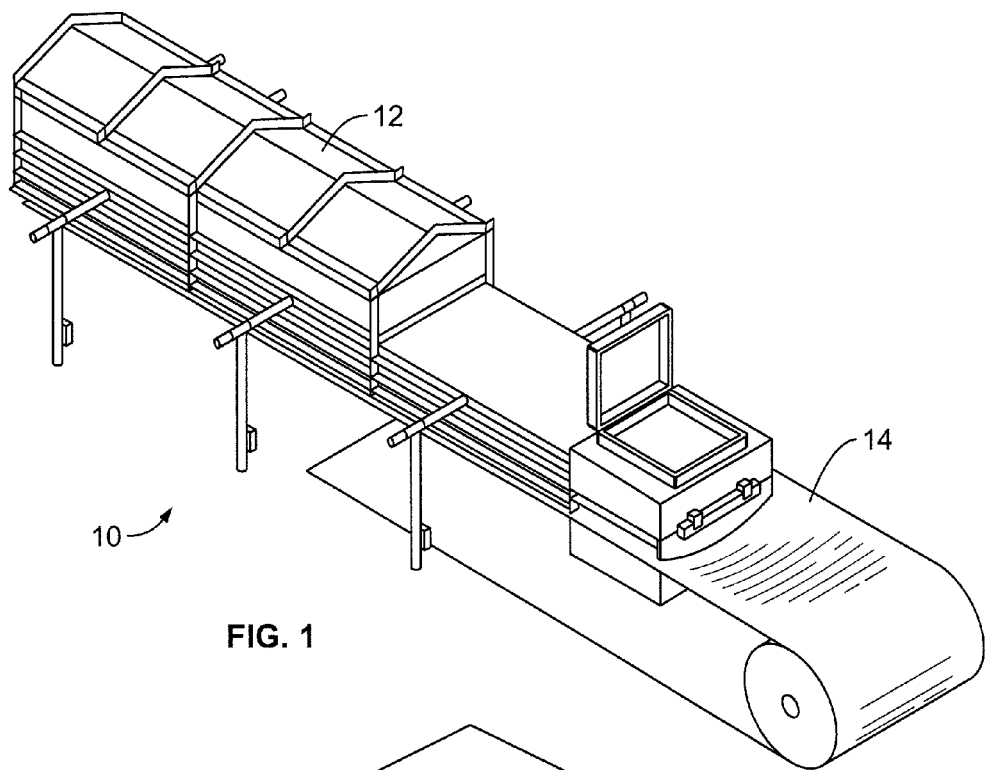
FIG. 1 is a perspective view of a bulk material conveying system utilizing a wearliner assembly in accordance with the present invention.

While this invention is susceptible of embodiments in many different forms, there is shown in the drawings, and will herein be described in detail preferred embodiments of the invention with the understanding that the present disclosure is to be considered as an exemplification of the principles of the invention and is not intended to limit the broad aspect of the invention to the embodiments illustrated.

FIGS. 1-13 and 15-16 show aspects of a wearliner assembly that is mounted inside the chute of a material conveying system. The wearliner assembly includes an externally located mechanism for adjusting the positioning of the wearliner.

Figure 2:
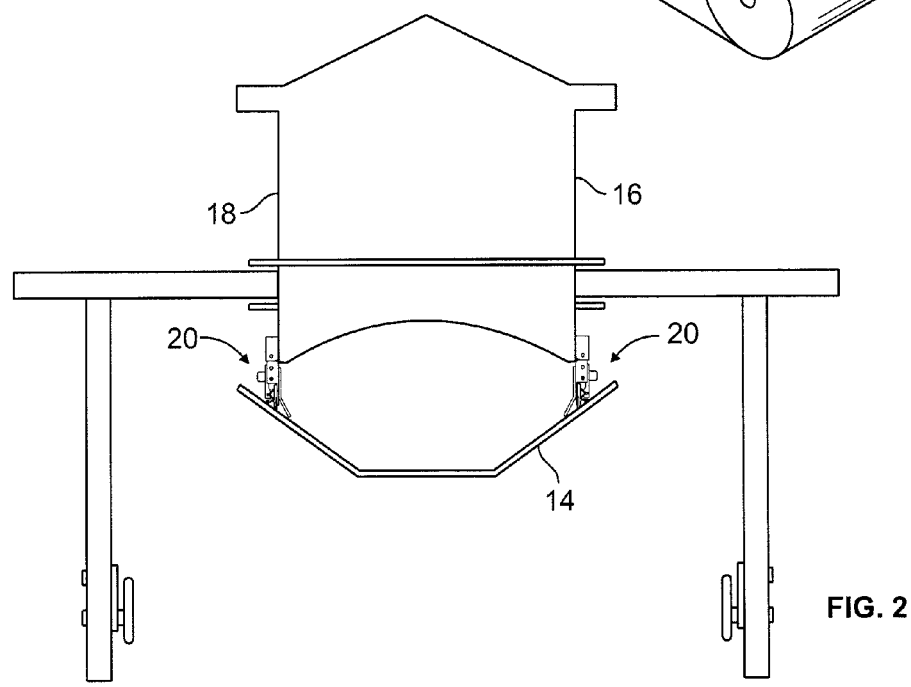
FIG. 2 is a cross-sectional view of the bulk material conveying system and wearliner assembly of FIG. 1.

A bulk material conveying system 10 with a wearliner assembly in accordance with the present invention is illustrated in the perspective view of FIG. 1 and the cross-sectional view of FIG. 2. The conveying system 10 includes a protective hood 12 positioned over a belt 14. The belt is designed to rotate to move a load of material placed on the upper surface of the belt 14.

As shown in cross-section in FIG. 2, the conveying system includes a first vertical chute wall (or skirt wall) 16 proximate a first side of the belt, and a second vertical chute wall 18 proximate a second side of the belt. A wearliner assembly 20 in accordance with the present invention is positioned at a lower end of each chute wall 16, 18.

Figure 3:
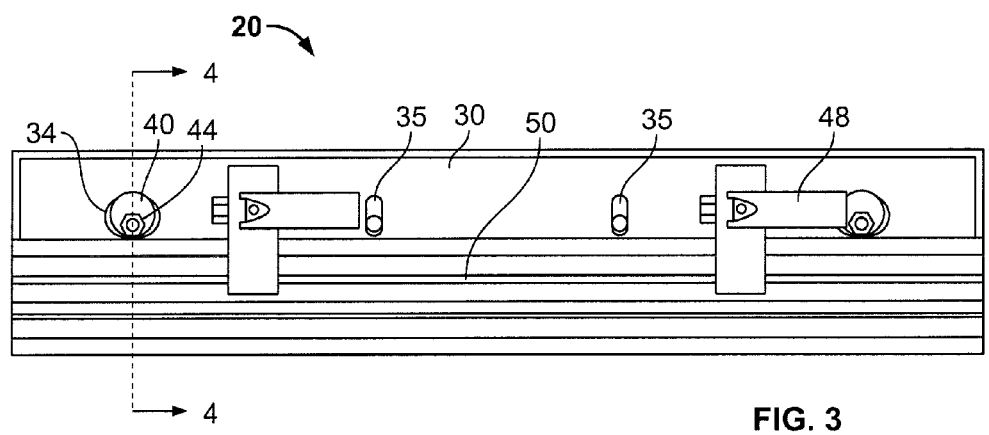
FIG. 3 is an exterior view of a wearliner assembly with the wearliner in a lowered position in accordance with an aspect of the present invention.
Figure 4:
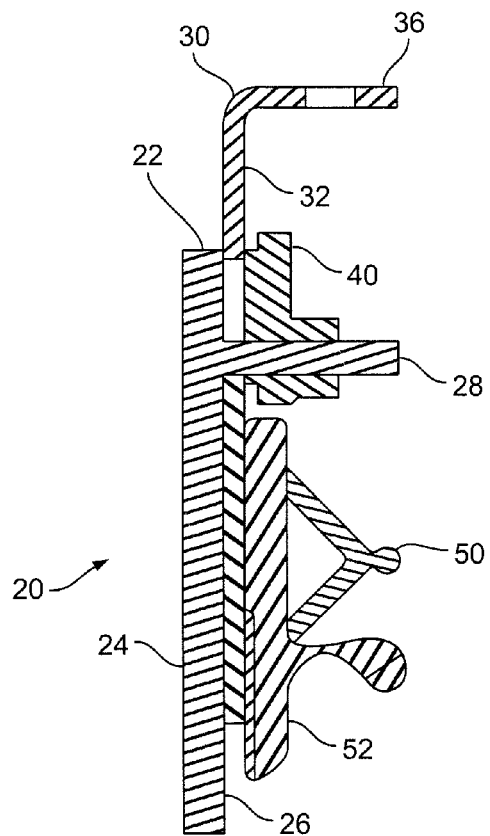
FIG. 4 is a cross-sectional view of the wearliner assembly of FIG. 3 taken through the camming mechanism.

FIGS. 3-6 illustrate the wearliner assembly 20 in a lowered position and a raised position. Turning first to FIGS. 3 and 4, the wearliner assembly 20 includes a wearliner 22. In a first embodiment, the wearliner 22 is a generally rectangular place (which can be ½ inch stainless steel, a ceramic material, or other suitable materials) having a load side 24 (i.e. a side facing the material carried on the belt 14 in the interior of the conveying system 10), and a non-load side 26 (i.e. a side facing toward the exterior of the system 10). One or more posts or studs 28 extend from the non-load side 26 of the wearliner 22. The studs 28 are used as mounting members or elements as explained below. The wearliner 22 is shown on its own in FIG.

In one embodiment, the wearliner assembly 20 includes a combination skirt extension and seal clamp unit 30 (shown on its own in FIG. 10). The skirt extension unit 30 includes a vertical wall portion 32 having a plurality of openings or apertures 34 aligned with the studs 28 of the wearliner 22. The openings 34 have a generally rectangular shape with rounded corners and are sized for engagement with a camming mechanism as discussed below. The unit can include other openings, such as slot type openings 35 to receive additional studs 28 to help support or align the wearliner 22 with respect to the unit 30. The skirt extension unit 30 also includes an upper connection flange 36 extending at a right angle proximate the top of the vertical wall portion 32. The flange 36 and vertical wall portion 32 form an L-shape in cross-section.

The flange 36 includes a plurality of holes 38 which can be utilized (with bolts and/or other suitable means) to secure the flange 36 to a mating flange element on the lower edge of the chute wall. In this configuration, the vertical wall portion 32 of the skirt extension unit 30 becomes an extension of the chute wall.

Figure 14:
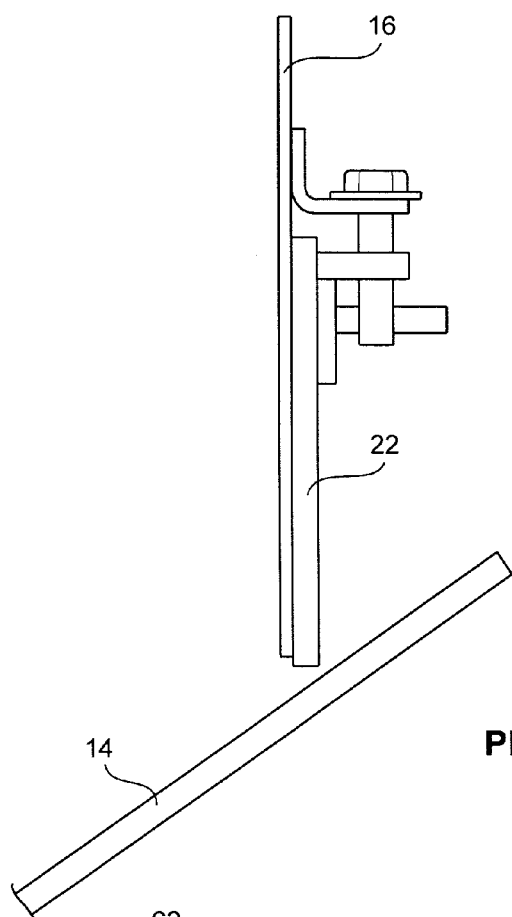
FIG. 14 is a cross-sectional view of wearliner assembly made in accordance with the prior art.

As illustrated in the Figures, the wearliners 22 of both wearliner assemblies 20 are positioned on the interior side of the respective chute wall (or the extended wall portion 32). In sharp contrast to this position, certain prior systems placed the wearliner on the exterior side of the chute wall like that shown in FIG. 14.

The studs 28 of the wearliner 22 are inserted through the openings 34 of the skirt extension unit 30 (and possibly 35). A camming mechanism, including a cam 40 (shown in FIGS. 8-10) having an opening 42, is placed over one or more studs 28 extending through an opening 34. A nut 44 cooperating with the end of the studs 28, holds the cam 40 in place (in this arrangement, the studs 28 act as bolts, which along with the nuts 44, secure the wearliner 22 to the unit 30). The cam 40 is generally cylindrical and includes a generally cylindrical camming surface 46 which is configured to contact an upper edge of the opening 34 of the skirt extension unit 30.

As shown in FIGS. 8-10, the opening 42 in the cam 40 is off-center, having a larger portion on one side of the opening 42 and a smaller portion on the other side of the opening 42. Accordingly, rotation of the cam 40 about this point changes the upper position of the camming surface 46 which, in turn, changes the height of the wearliner 22. In this manner, the position of the wearliner 22 can be adjusted. That is, the wearliner 22 can be raised or lowered by loosening the nuts 44, rotating the cams 40 and retightening the nuts 44.

Figure 5:
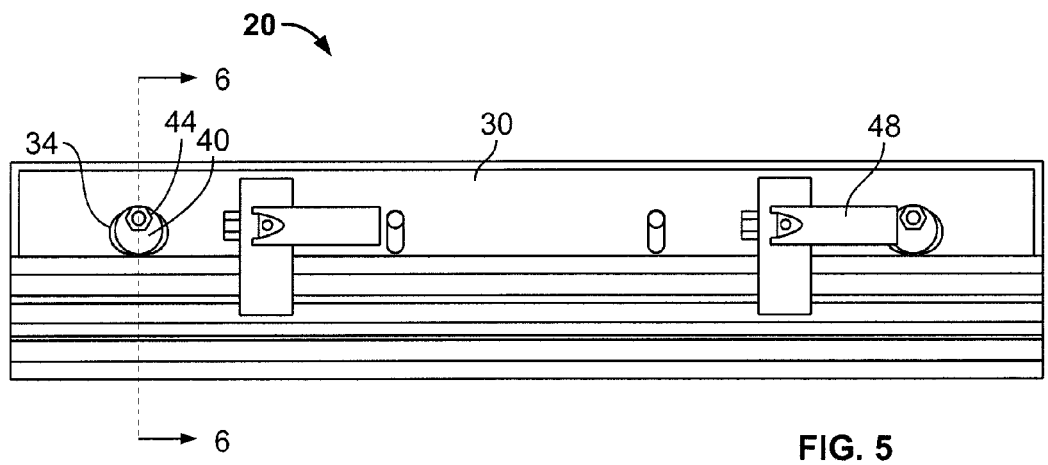
FIG. 5 is an exterior view of a wearliner assembly with the wearliner in a raised position in accordance with an aspect of the present invention.
Figure 6:
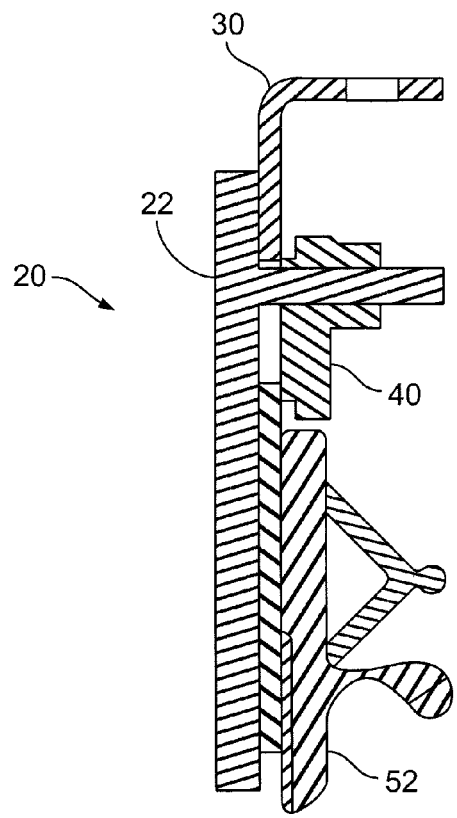
FIG. 6 a cross-sectional view of the wearliner assembly of FIG. 5 taken through the camming mechanism.
Figure 11:
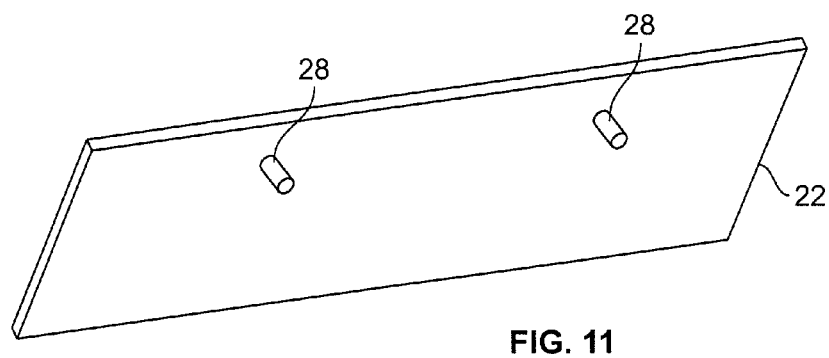
FIG. 11 is a perspective view of a wearliner for use in the wearliner assembly of the present invention.

As shown in FIGS. 3 and 4, the cam 40 is positioned with a larger portion above the stud 28 such that the wearliner 22 is lowered with respect to the vertical wall 32 (as shown in FIG. 4, the bottom edge of the wearliner 22 extends below the lower edge of the seal 52). FIGS. 5 and 6 show the cam 40 rotated so that the larger portion is below the stud 28 with the smaller portion contacting the upper edge of opening 34. This raises the wearliner 22 with respect to the vertical wall 32 (as shown in FIG. 6, the bottom edge of the wearliner 22 is slightly above the lower edge of the seal 52).

As evident from the Figures, the camming mechanism is on the exterior side of the chute wall. Accordingly, the internally positioned wearliner 22 can be adjusted from the exterior of the system 10.

The skirt extension unit 30 also includes one or more clamps 48 connected to a V-shaped (in cross-section) bar 50. The clamps 48 and bar 50 hold a seal 52 in place on the non-load side of the wall portion 32. The seal 52 extends lower than the wall portion 32 as shown. The clamps 48 can be quick release clamps.

Figure 12:
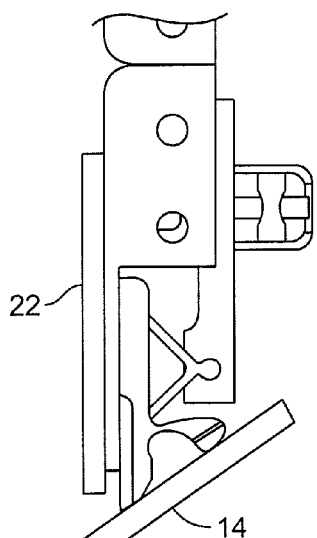
FIG. 12 is a cross-sectional view of the wearliner assembly positioned proximate one side of the belt of the material conveying system.
Figure 13:
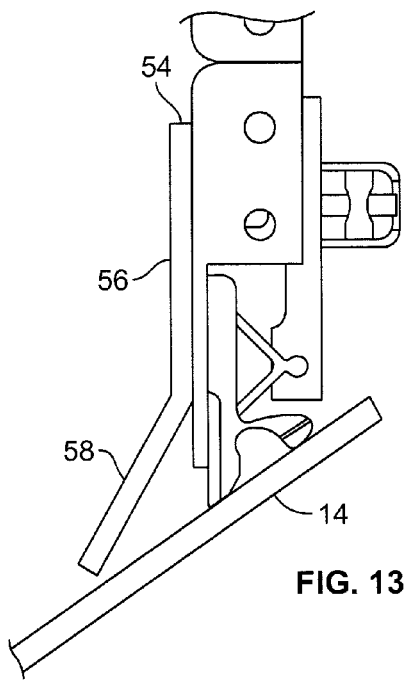
FIG. 13 is a cross-sectional view of an alternative wearliner in a wearliner assembly.

Referring to FIG. 12, the wearliner assembly 20 is shown positioned above the belt 14. The wearliner 22 appears (in cross-section) as a straight line. However, in one alternative embodiment shown in FIG. 13, a wearliner 54 can be configured with a deflector portion. In this embodiment, the wearliner 54 includes an upper vertical wall portion 56, and a lower wall portion 58 extending inwardly (toward the material load) from the bottom of the upper vertical wall portion 56 at an angle with respect to the upper vertical wall portion.

In an alternative embodiment the wearliner 22 can be secured directly to the chute wall. Openings—similar to openings 34 of the skirt extension unit 30—can be made in the chute wall to accommodate this configuration.

Figure 15:
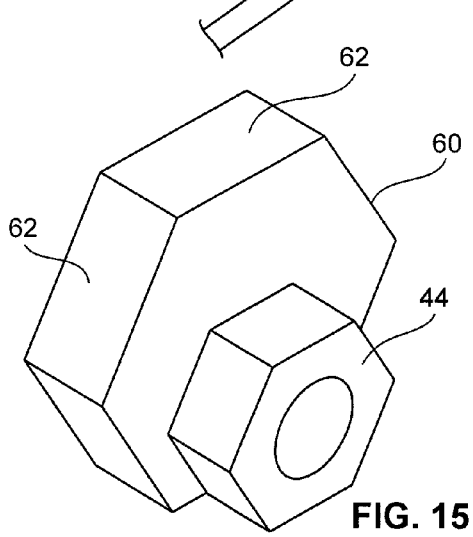
FIG. 15 is a perspective view of an exterior side of another embodiment of a cam of a camming mechanism of the wearliner assembly of the present invention; and, FIG. 16 is a perspective view of an interior side of the cam of FIG. 15.
Figure 16:
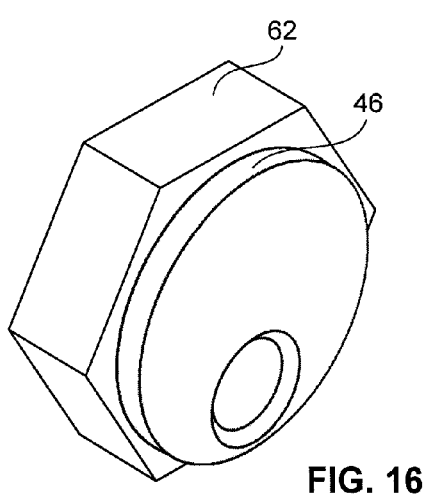

An alternative camming mechanism includes cams 60 shown in FIGS. 15 and 16. The cams 60 include a bolt 44 on one side and a generally cylindrical camming surface 46 on the other side similar to the embodiment of FIGS. 7 and 8. However, unlike the embodiment of FIGS. 7 and 8, the cam 60 has a generally hexagonal outer shape (as opposed to the cylindrical shape of the cam 40) with a plurality of flat surfaces 62. The flat surfaces enable a tool (e.g., a clamp or wrench) to grip the cam 60, and facilitate adjustment of the mechanism. While a hexagonal outer shape is shown, other shapes having flat surfaces (or surfaces shaped to be more easily gripped and maneuvered) can be used.

Many modifications and variations of the present invention are possible in light of the above teachings. It is, therefore, to be understood within the scope of the appended claims the invention may be protected otherwise than as specifically described.

We claim:

1. An externally adjustable internal wearliner assembly for a material conveying system comprising:

a first wearliner having a load side and a mounting side, the mounting side of the wearliner including a first mounting member extending outward from the mounting side; and, a first externally mountable camming mechanism connectable to the first mounting member wherein the first wearliner is configured to be positioned on an interior side of a first skirt portion of a conveying system and the camming mechanism is configured to be positioned on an external side of the first skirt portion, and wherein movement of the camming mechanism one of raises and lowers the first wearliner when mounted to the first skirt portion.

2. The wearliner assembly of claim 1 further comprising:

an extension skirt panel connectable to the first skirt portion of the conveying system the extension skirt panel having a first side positioned against the mounting side of the first wearliner and a second opposing side, the extension skirt panel having a first opening aligned with the first mounting member wherein the first mounting member passes through the first aperture;

a seal; and, a clamp connected to the second side of the extension skirt panel for holding a seal to the wearliner assembly.

3. The wearliner assembly of claim 2 wherein the extension skirt panel includes an L-shaped bracket portion for connecting the extension skirt panel to the first skirt portion.

4. The wearliner assembly of claim 1 wherein the first wearliner includes a flat rectangular plate portion.

5. The wearliner assembly of claim 1 wherein the first wearliner includes a first rectangular plate portion in a vertical plane having a top portion and a bottom portion, and a second plate portion extending at an angle from the bottom portion of the first rectangular plate portion toward the interior of the conveying system.

6. The wearliner assembly of claim 2 wherein the first mounting member is a stud welded to the mounting side of the first wearliner.

7. The wearliner assembly of claim 6 wherein the camming mechanism is secured to the stud and abuts an edge of the aperture such that rotational movement of the camming mechanism one of raises and lowers the first wearliner with respect to the first skirt portion.

8. The wearliner assembly of claim 7 wherein the camming mechanism includes a cam having a generally cylindrical outer surface which abuts the edge of the aperture, the cam having a non-centrally positioned point of rotation.

9. The wearliner assembly of claim 8 wherein the cam is secured to the stud by a turnable nut.

10. The wearliner assembly of claim 8 wherein the cam has a first outer flat surface and a second outer flat surface.

11. The wearliner assembly of claim 1 wherein the wearliner includes a second mounting member spaced from the first mounting member and extending outward from the mounting side, and the assembly includes a second externally mountable camming mechanism connectable to the second mounting member.

12. The wearliner assembly of claim 1 wherein the wearliner is stainless steel.

13. The wearliner assembly of claim 1 wherein the wearliner is ceramic.

14. The wearliner assembly of claim 2 wherein the seal is rubber.

15. The wearliner of claim 2 wherein the clamp includes a quick release mechanism.

16. A bulk material conveying system having an externally adjustable internal wearliner comprising:

a bulk material conveying system including a moveable belt for transporting material, a first substantially vertical chute wall proximate a first side of the belt, the first chute wall having a load facing side and an exterior side, the first chute wall having a lower portion positioned above an upper surface of the belt;

a first wearliner assembly connected to the lower portion of the first chute wall, the first wearliner assembly including a skirt extension connected to the lower portion of the first chute wall, the skirt extension including a vertical wall portion extending down from and aligned with the lower portion of the first chute wall and having a plurality of mounting openings, the vertical wall portion having a load facing side and an exterior side; a wearliner positioned against the load facing side of the vertical wall portion and having a plurality of first mounting members extending outward from the wearliner through the openings in the vertical wall portion, and a plurality of first adjustable cams connected to the first mounting members on the exterior side of the vertical wall portion.

17. The bulk material conveying system of claim 16 further comprising a second chute wall proximate a second side of the belt, the second chute wall having a lower portion positioned above the upper surface of the belt; and, a second wearliner assembly connected to the lower portion of the second chute wall, the second wearliner assembly including a skirt extension connected to the lower portion of the second chute wall, the skirt extension including a vertical wall portion extending down from and aligned with the lower portion of the second chute wall and having a plurality of mounting openings, the vertical wall portion having a load facing side and an exterior side; a wearliner positioned against the load facing side of the vertical wall portion and having a plurality of second mounting members extending outward from the wearliner through the openings in the vertical wall portion, and a plurality of second adjustable cams connected to the second mounting members on the exterior side of the vertical wall portion.

18. The bulk material conveying system of claim 16 wherein the skirt extension includes a clamp connected to the exterior side and a seal held by the clamp.

19. The bulk material conveying system of claim 16 wherein the cam includes a generally cylindrical camming surface and has a non-central point of rotation.

20. The bulk material conveying system of claim 16 wherein the wearliner includes a first vertical portion and a second portion extending inwardly from a lower portion of the first vertical portion at an angle.

* * * * *

UNITED STATES PATENT AND TRADEMARK OFFICE
CERTIFICATE OF CORRECTION

| | | |
|---|---|---|
| PATENT NO. | : 8,800,756 B2 | Page 1 of 1 |
| APPLICATION NO. | : 13/889551 | |
| DATED | : August 12, 2014 | |
| INVENTOR(S) | : John S. Pircon et al. | |

It is certified that error appears in the above-identified patent and that said Letters Patent is hereby corrected as shown below:

In the Claims:

Column 6, line 64, in Claim 15, after "wearliner" insert --assembly--.

Signed and Sealed this
Eighteenth Day of November, 2014

Michelle K. Lee
*Deputy Director of the United States Patent and Trademark Office*